Oct. 3, 1950 M. M. LEVY 2,524,708
PULSE MULTIPLEX RECEIVING SYSTEM
Filed Feb. 27, 1948 4 Sheets-Sheet 1
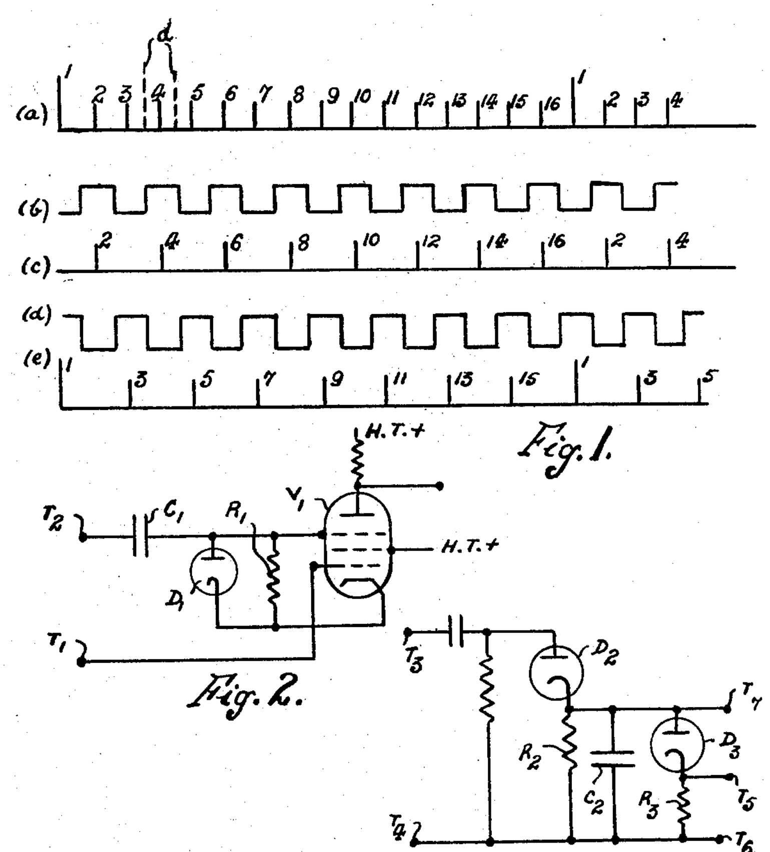
Fig. 1. Fig. 2.
Fig. 3.
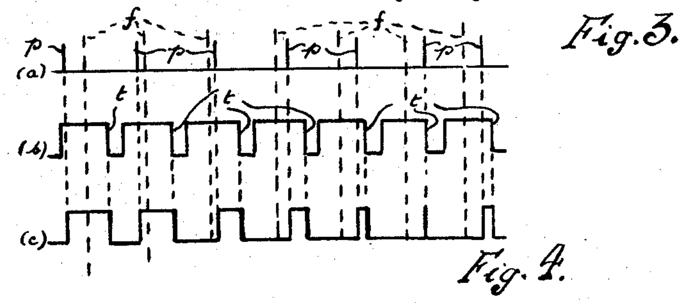
Fig. 4.
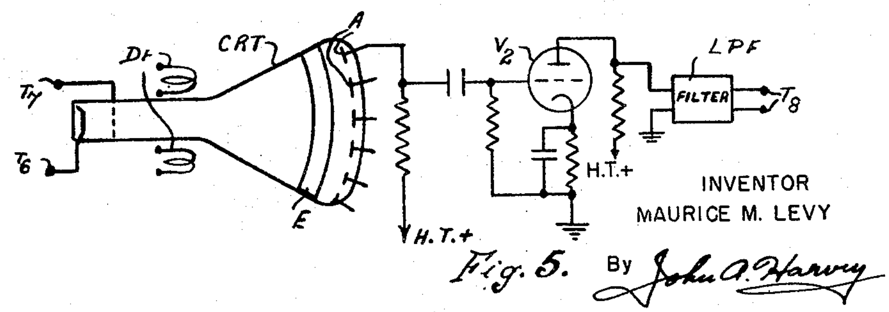
Fig. 5.
INVENTOR
MAURICE M. LEVY
By John A. Harvey
ATTORNEY INVENTOR
MAURICE M. LEVY
By John P. Harvey
ATTORNEY INVENTOR
MAURICE M. LEVY
By John A. Harvey
ATTORNEY INVENTOR
MAURICE M. LEVY
By John A. Harvey
ATTORNEY Patented Oct. 3, 1950

2,524,708

UNITED STATES PATENT OFFICE 2,524,708

PULSE MULTIPLEX RECEIVING SYSTEM

Maurice Moise Levy, London, England, assignor to The General Electric Company, Limited, London, England Application February 27, 1948, Serial No. 11,368
In Great Britain February 6, 1947

Section 1, Public Law 690, August 8, 1946
Patent expires February 6, 1967

4 Claims. (Cl. 179—15)

Figure 6:
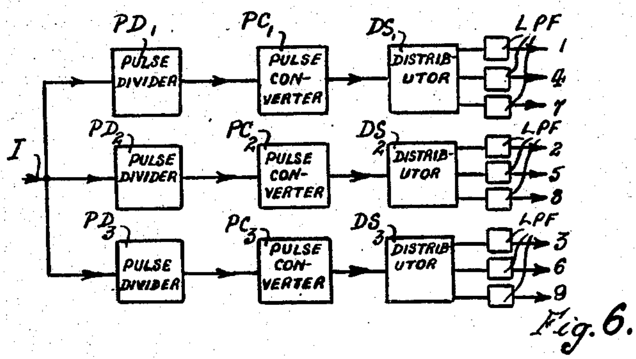

The present invention relates to pulse multiplex receiving systems.

In most pulse multiplex receiving or multichannel pulse signalling systems, each signalling channel is represented by a train of pulses, the trains of pulses all having the same recurrence frequency, referred to as the channel recurrence frequency, and the pulses of the various trains are interlaced with one another. Thus each channel occupies a different part of each cycle of the channel recurrence period. The several trains of pulses are modulated in time (or phase), width (or duration), or otherwise, and the trains are combined in such a way that there is no overlap in time between the pulses of different trains.

The present invention is concerned with the demodulation of time- (otherwise known as phase-) modulated pulses in multi-channel systems, and has for its object to provide an improved method of and means for effecting such demodulation.

According to the present invention, a method of demodulating time-modulated channel pulses comprises the steps of broadening the channel pulses of a plurality $s$ of interlaced channels to provide a time duration therefor greater than the time duration of any one of said channels in such a manner as to produce broadened pulses whose leading or trailing edges are defined by the instants of occurrence of the corresponding channel pulses and whose trailing or leading edges, respectively, occur at regularly recurring instants, separating the broadened pulses of different channels from one another and extracting modulation frequency components from the broadened pulses of each of the said plurality of channels.

In order to avoid or reduce risk of cross-talk in view of the broadening of the pulses, the pulses are preferably divided into $r$ groups, where $r$ is an integer greater than one, each group containing one or more trains of channel pulses. Thus the first group may contain channels 1, $r+1$, $2r+1$, etc., the second group may contain channels 2, $r+2$, $2r+2$, etc., the $r$th group containing channels $r$, $2r$, $3r$, etc. The pulses of each group may then be broadened and demodulated separately.

The division into groups and the selection of the individual channels within each group before final demodulation after conversion of time to width modulation, may be effected in any known or suitable way, for instance by means of a cathode ray distributor of any kind or a delay line.

The present invention also provides pulse multiplex receiving apparatus for demodulating time-modulated channel pulses, the apparatus comprising means for broadening the channel pulses of a plurality $s$ of interlaced channels to provide a time duration therefor greater than the time duration of any one of said channels in such a manner as to produce broadened pulses whose leading or trailing edges are defined by the instants of occurrence of the corresponding channel pulses and whose trailing or leading edges, respectively, occur at regularly recurring instants, means for separating the broadened pulses of different channels from one another and means associated with each channel for extracting the modulation frequency components from the broadened pulses.

Figure 7:
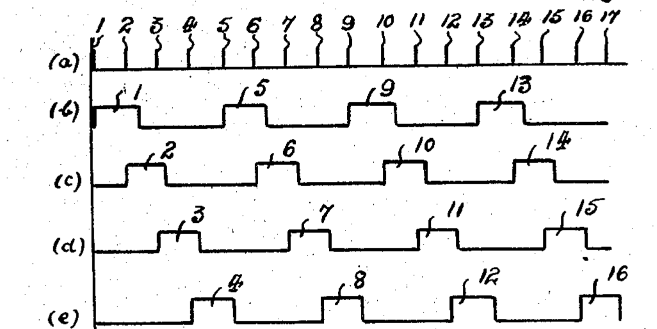
Figure 8:
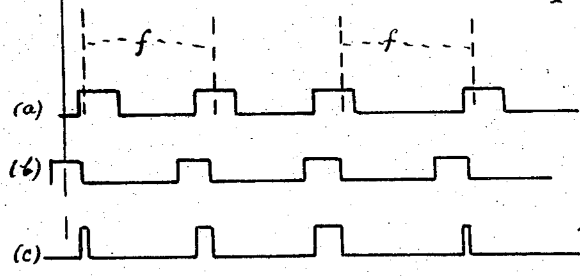
Figure 9:
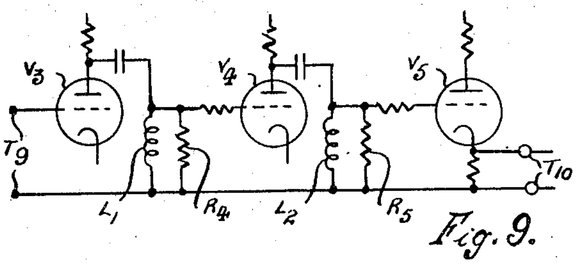
Figure 10:
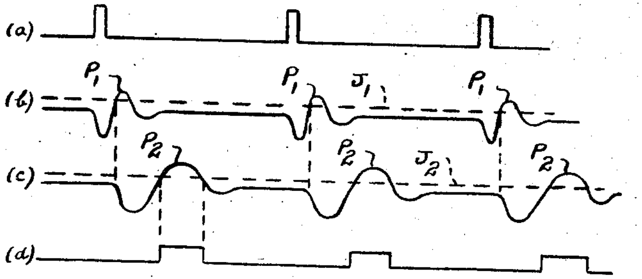
Figure 11:
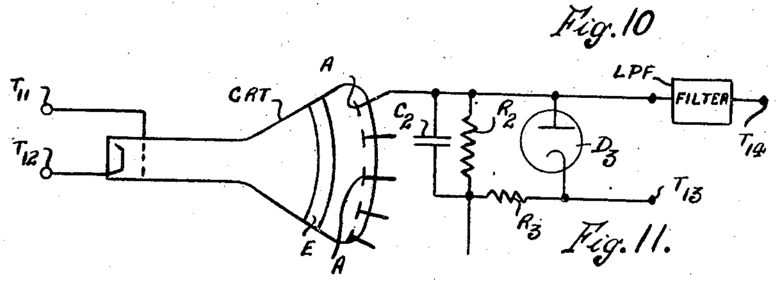
Figure 12:
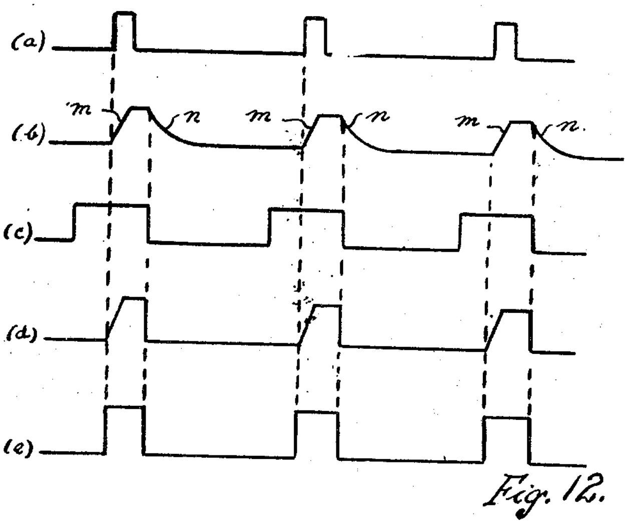

Other features of the invention will be apparent from the following description of certain embodiments of the invention which is given by way of example with reference to the accompanying drawings, in which Fig. 1 is a diagram illustrating the division of multi-channel pulses into two groups, Fig. 2 is a circuit diagram illustrating one way of performing the division shown in Fig. 1, Fig. 3 shows one circuit, for use in apparatus according to the invention, for converting time-modulated pulses into width-modulated pulses, Fig. 4 is a diagram illustrating the effect produced by the circuit of Fig. 3, Fig. 5 is a circuit diagram showing one way of selecting one set of channel pulses and demodulating these pulses, Fig. 6 is a block diagram illustrating the application of the invention to a nine-channel system, Fig. 7 is a diagram illustrating the division of pulses into four groups and the broadening of such pulses, Fig. 8 shows diagrammatically how the broadened, time-modulated pulses of Fig. 7 can be converted into width-modulated pulses, Fig. 9 is a circuit diagram of an arrangement for broadening pulses as a separate operation, Fig. 10 illustrates the operation of the circuit of Fig. 9, Fig. 11 shows an alternative circuit which may be used instead of that of Fig. 3, Fig. 12 is a diagram indicating faults which may be met with and the way in which such faults can be corrected.

Figure 13:
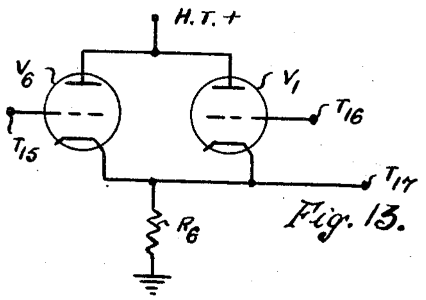
Figures 14, 15:
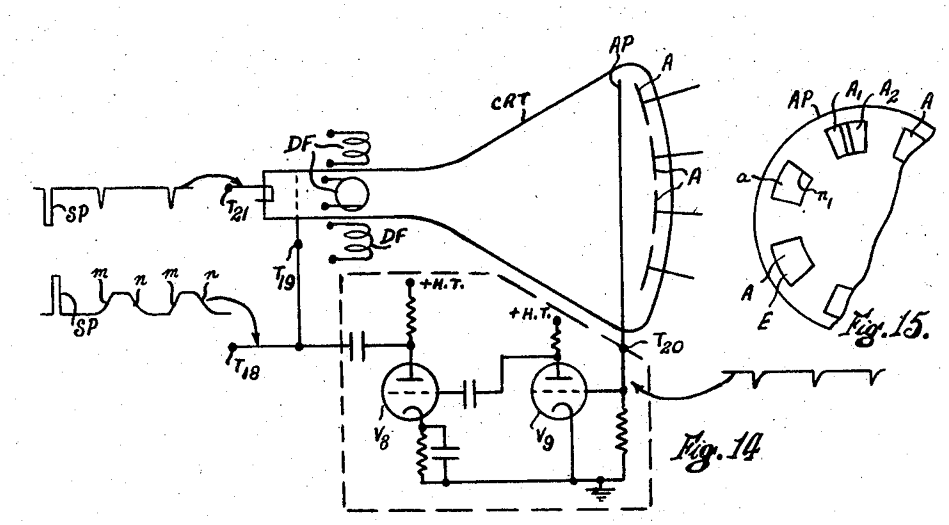
Figure 16:
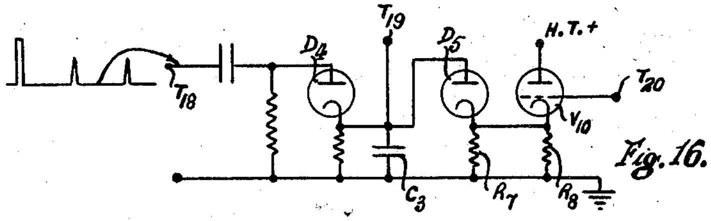
Figure 17:
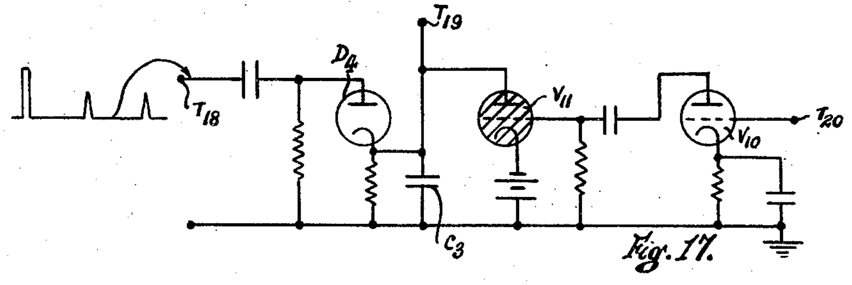
Figure 18:
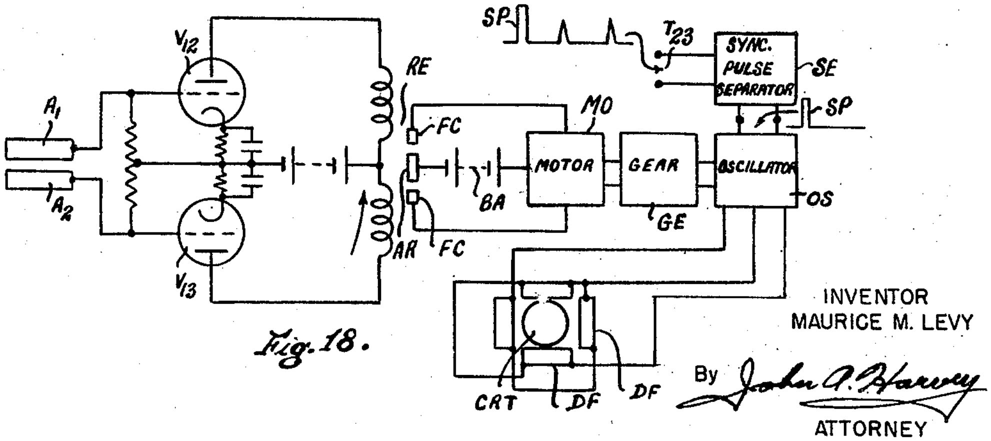

Fig. 13 shows a circuit diagram of an arrangement for producing one of the corrections shown in Fig. 12, and Fig. 14 shows a further circuit according to the invention for converting broadened time-modulated pulses into width-modulated pulses and separating channels, Fig. 15 is a view at right angles to that of Fig. 14 of a detail of Fig. 14, Figs. 16 and 17 show modifications of a part of Fig. 14 by which the broadening of time-modulated pulses may be carried out and Fig. 18 shows an arrangement for the automatic control of synchronism of the cathode ray beam in Figs. 14, 16 or 17.

Referring now to Fig. 1, there is shown at (*a*) the pulses of a little over one cycle at the channel recurrence frequency of a 16-channel system. These channels are numbered 1 to 16. The pulses are shown unmodulated but in practice they will be time-modulated, that is to say their instants of occurrence will vary on either side of the unmodulated position shown in accordance with a signal voltage to be transmitted. In order to avoid cross-talk the pulses must remain within a total time interval rather less than the interval between successive channels. Thus channel 4 must not swing beyond the dotted lines *d*. In Fig. 1 channel 1 is reserved for synchronising signals which are shown as of larger amplitude than the other pulses and these synchronising pulses are unmodulated.

The method of demodulation according to the invention involves broadening the pulses, usually to a width greater than the channel interval (the interval between the dotted lines *d*) and in order to avoid cross-talk the pulses are in this example divided into two groups, one containing the even and the other the odd-numbered channels. Thus in this case *r*, above referred to, has the value 2 and the number *s* of channels in each group is 8.

This division into groups may be effected by two oscillations of nearly rectangular wave form as shown at (*b*) and (*d*). These oscillations differ only in being 180° phase displaced relatively to one another. They may be generated at a receiver by a suitable oscillator under the control of the synchronising pulses. By suitably combining the pulses of (*a*) and (*b*) there can be obtained the train (*c*) containing only the even-numbered channels and by suitably combining pulses (*a*) and (*d*) there can be obtained the train (*e*) containing only the odd-numbered pulses.

A circuit for effecting this combination is shown in Fig. 2. The pulses (*a*) may be applied at terminal $T_1$ to the control grid of a valve $V_1$ and the pulses (*b*) or (*d*) at terminal $T_2$ to the suppressor grid of the valve. The pulses (*c*) or (*e*) are then obtained at the anode. By means of a condenser $C_1$, diode $D_1$ and resistor $R_1$, the suppressor grid can be automatically biased to a suitable voltage.

It will often be desirable to make *r* greater than 2, that is to divide the pulses into more than two groups. This can be done, for example, by the use of pulses such as those at (*b*) in Fig. 1 but of a suitably lower recurrence frequency.

One circuit whereby the pulses at (*c*) or (*e*) in Fig. 1 (or pulses at greater spacing produced by greater subdivision), can be broadened and at the same time converted from time- into width-modulated pulses is shown in Fig. 3. The pulses appearing between the anode and cathode of the valve $V_1$ in Fig. 2 are applied between terminals $T_3$ and $T_4$ to a diode $D_2$, the pulses tending to drive the anode of the diode positive. The cathode of the diode $D_2$ is connected to $T_4$ through a condenser $C_2$ in parallel with a resistor $R_2$, the time constant $C_2R_2$ being large compared with the channel width. Pulses of rectangular wave form and of the same frequency as the pulses (*b*) or (*d*) in Fig. 1 are applied between the terminals $T_5$ and $T_6$ and thus across a resistor $R_3$ in series with a diode $D_3$.

When a channel pulse ((*c*) or (*e*) Fig. 1) appears between terminals $T_3$ and $T_4$, the cathode of the diode $D_3$ has been made sufficiently positive relatively to $T_6$ by the presence of a pulse (*b*) or (*d*) in Fig. 1 to prevent appreciable flow of current in this diode, and consequently the condenser $C_2$ charges rapidly and remains charged until the cathode of the diode $D_3$ is driven suddenly in the negative sense by the steep trailing edge of the pulse (*b*) or (*d*), when the condenser $C_2$ is effectively short-circuited. From the instant of occurrence of a channel pulse to the instant of occurrence of the said trailing edge, the rectangular pulses maintain the terminal $T_5$ sufficiently positive relatively to the cathode of the diode $D_2$ for the diode $D_3$ to present substantially an infinite impedance to the condenser $C_2$. Width-modulated pulses are, therefore, obtained between terminals $T_7$ and $T_6$.

The operation above described is illustrated in Fig. 4. At (*a*) are shown time-modulated channel pulses *p*, the mean pulse positions (that is the mid-points of the channels) are indicated by dotted lines *f*. The pulses *p* are of a plurality of interlaced channels, such as the pulses at (*c*) or (*e*) in Fig. 1. At (*b*) are shown rectangular pulses which may be applied between terminals $T_5$ and $T_6$ in Fig. 3. The steep trailing edges of these pulses are shown at *t*. The leading edges of the pulses are arranged to occur just before the earliest moment of occurrence of a channel pulse *p*. At (*c*) is shown the voltage between terminals $T_7$ and $T_6$ of Fig. 3. The leading edges of the pulses at (*c*) occur at the moments of occurrence of the pulses *p* at (*a*), and the trailing edges of the pulses at (*c*) occur at the instants of occurrence of the trailing edges *t* at (*b*), that is at regularly recurring instants. The circuit of Fig. 3 is thus seen to effect a broadening and a conversion to width-modulation simultaneously.

If desired it may be arranged that the trailing edges of the pulses at (*c*) (Fig. 4) occur at the instants of occurrence of the pulses *p* at (*a*) and that the leading edges of the pulses at (*c*) occur at the instants of occurrence of the leading edges of the pulses at (*b*). This result may for example be obtained by applying the (*b*) pulses between terminals $T_3$ and $T_4$ in Fig. 3 and applying the (*a*) pulses in a negative sense to the terminals $T_5T_6$, whereby on the occurrence of an (*a*) pulse the cathode of the diode $D_3$ is driven negative.

If the rectangular pulses at (*b*) in Figure 4 are more widely spaced in relation to their duration than is shown and if one or more undesired channel pulses occur between the rectangular pulses, the circuit of Fig. 3 will largely suppress such undesired pulses. The diodes $D_2$ and $D_3$ may be replaced by suitably connected hard or gas-filled triodes or other valves.

Assuming that the pulses applied to terminals $T_3T_4$ in Fig. 3 are those at (*c*) or (*e*) in Fig. 1, the various individual channels may be selected by a circuit such as is shown in Fig. 5. The varying-width pulses at terminals $T_7T_6$ of Fig. 3 are applied to terminals of the same references in Fig. 5 and thus to control the cathode ray of a cathode ray tube CRT having eight anodes A arranged in a circle. Only six of these anodes are shown. The cathode ray is caused to scan over the eight anodes in succession by suitable deflecting currents at the channel recurrence frequency applied to coils of which one pair is shown at DF. In order to obtain positive pulses at the anodes A, secondary emission effects may be used in known manner, secondary electrons being collected at an electrode E maintained suitably positive relatively to the anodes A.

Each anode A is connected to a separate valve of which that for one channel is shown at $V_2$. The output of the valve is applied to a low-pass filter LPF and the demodulated signal is obtained at terminals $T_8$. The valve $V_2$ can be omitted if amplification is not required. If the arrangement of Fig. 5 is used to select the channels from the group at (c) in Fig. 1, the channels at (e) in Fig. 1 may be selected by a second arrangement such as is shown in Fig. 5.

Alternatively the low-pass filters may be connected directly to the anodes A and amplifying valves such as $V_2$ may, if necessary, be connected to the outputs of the filters. In this case the pulses applied to the low-pass filters by the anodes may be either positive or negative and, if negative, secondary emission need not be employed, the electrode E being then unnecessary. The filtering may if desired be performed in two steps, a separate filter being provided in the input and output circuit of the valve $V_2$.

It is usually preferable, in order to avoid cross-talk, to divide the pulses, as at (a) in Fig. 1, into more than two groups. A block diagram of an arrangement in which the division of a nine-channel system is into three groups is shown in Fig. 6. The pulses of the nine channels are applied at I to the inputs of three pulse divider circuits $PD_1$, $PD_2$ and $PD_3$ each of which may be of the kind shown in Fig. 2 employing rectangular pulses of the kind at (b) or (d) in Fig. 1 but having a recurrence frequency equal to one third of that of the pulses to be divided. The separated groups are applied respectively to pulse converting circuits $PC_1$, $PC_2$ and $PC_3$ each of which may be of the kind shown in Fig. 3 and to distributor selectors $DS_1$, $DS_2$, and $DS_3$ of the cathode ray tube of the type shown in Fig. 5 or of other type to separate the three channels of each group. In each channel is connected a demodulating circuit LPF which may be a low-pass filter. The signals of the individual channels are taken at terminals 1 to 9.

An alternative way of dividing pulses into $r$ groups is to use a cathode ray distributor, such as that shown at CRT in Fig. 5, but having $r$ anodes A. The cathode ray is rotated at $r$ times the channel recurrence frequency and the pulses to be divided are applied, either to the terminal $T_6$ or $T_7$ (according to the sense of the pulses) to control the intensity of the cathode ray. One group of pulses is then obtained at each anode.

Instead of broadening the pulses and converting their time-modulation to width-modulation in one operation, the steps may be carried out separately.

In Fig. 7 there are shown at (a) pulses of a multi-channel system. These pulses are divided into four groups by a circuit of the kind shown in Fig. 2 or otherwise, and each pulse is then broadened so that its width exceeds that of one channel. The four groups of broadened pulses are shown at (b), (c) and (d) in Fig. 7. The pulses in Fig. 7 are shown unmodulated.

In Fig. 8 is shown at (a) one group of pulses as in Fig. 7 but time-modulated, the mean position of the leading edge of the pulses being indicated by dotted lines $f$. At (b) in Fig. 8 are shown rectangular pulses which when suitably combined with the pulses at (a) result in width-modulated pulses as shown at (c). The combination may be effected by the circuit of Fig. 3.

One circuit which may be used for broadening the pulses to produce pulses as shown at (b), (c), (d) and (e) in Fig. 7 is shown in Fig. 9 and is of the kind described in the specification of co-pending British patent application No. 22,824/46. Each group of narrow pulses is applied to terminals $T_9$ of a circuit as shown in Fig. 9. The circuit in this case has three stages with valves $V_4V_3$ and $V_5$ but more or fewer may be used if desired. Between each pair of stages is a tuned circuit comprising an inductor $L_1$ or $L_2$ resonating with the capacity of the valves (which capacity may be added to if necessary) and shunted by a suitable damping resistor $R_4$ or $R_5$.

In Fig. 10 is shown at (a) the pulses applied at $T_9$, at (b) the voltage applied to the valve $V_4$ owing to shock excitation of the circuit $L_1R_4$. The positive-going pulses $P_1$ are limited at a level indicated by the dotted line $J_1$ by suitably biasing the grid circuit of the valve $V_4$. Shock excitation of the circuit $L_2R_5$ gives rise to a voltage as at (c) in Fig. 10 which is limited at the level $J_2$ by automatic biasing in the grid circuit of the valve $V_5$ which is connected as a cathode-follower. The voltage at the terminals $T_{10}$, after suitable amplification, will have a form somewhat as shown at (d) in Fig. 10.

The damping by the resistors $R_4$ and $R_5$ must be chosen to avoid cross-talk between adjacent pulses of different chanels.

A circuit which, in conjunction with the circuit of Fig. 9, can perform the functions of those in Figs. 3 and 5 and if desired also that of Fig. 2 is shown in Fig. 11. A group of time-modulated channel pulses, such as those at (a) in Fig. 4, is applied to the terminal $T_{11}$ in Fig. 11. If of opposite polarity the pulses would be applied to terminal $T_{12}$. To the terminal $T_{13}$ is applied a train of rectangular pulses as shown at (b) in Fig. 4. The circuit elements $D_3C_2R_2$ perform as described in connection with Fig. 3. One such circuit with a low-pass filter LPF (preferably preceded by an amplifier) is associated with each anode A of the cathode ray tube distributor CRT which has a number of anodes equal to the number of channels in the group. The cathode ray is deflected to sweep over the anodes, performing one revolution in the channel recurrence period. The time constant of the circuit $C_2R_2$ is, as before, made large compared with the pulse width required. Width-modulated pulses, such as those at (c) in Fig. 4, are obtained at the anode of the diode $D_3$ and the demodulated signal at terminal $T_{14}$.

If desired, pulses, such as those at (a) in Fig. 1 or 7 may be applied to the terminal $T_{11}$ in Fig. 11 (or to terminal $T_{12}$ if the pulses are of opposite sign) and the cathode ray tube may then serve to divide the pulses into groups, such as those at (b), (c), (d) and (e) in Fig. 7 but un-broadened. The circuits $D_3$, $C_2$, $R_2$ may then serve to broaden the pulses and convert the time-modulation to width-modulation. Since a group of channel pulses appears at each anode A, the filter LPF is replaced by a further distributor, of the cathode ray type shown in Fig. 5 or of other type, in order to separate the individual channels, after which the pulses of each channel are demodulated separately by means of a low pass filter. In this case the number of anodes is made equal to the number of groups into which the pulses are to be divided and the cathode ray is rotated at the group recurrence frequency.

An alternative way of employing a cathode ray tube distributor CRT, such as that in Fig. 5, is to apply say to the terminal $T_7$ a group of broadened pulses, such as say (*d*) in Fig. 10 and to apply to the terminal $T_6$ rectangular pulses as at (*b*) in Fig. 4. The trailing edges *t* of the latter pulses are arranged to occur before the latest trailing edges of the broadened pulses whereby the cutting off of the cathode ray is determined by the trailing edge *t* and consequently width-modulated pulses are obtained at the anodes A.

Instead of using rectangular pulses such as (*b*) in Fig. 4, the anodes A may be shaped and disposed to produce a like effect. Thus the instants of occurrence of the trailing edges (say) is determined by the instants at which the cathode ray beam passes over the trailing edges of the anodes.

Referring now to Fig. 12, it may be found that, after broadening, channel pulses instead of having their original rectangular shape as at (*a*) have a shape as at (*b*) where the vertical leading edge is represented by a less steep portion *m* and the trailing edge by an exponential form as at *n*. These faults give rise to distortion of the modulation and that at *n* may also give rise to cross-talk if the part *n* extends too far.

In order to remove these faults, according to a feature of the invention, there may be used firstly a circuit such as that of Fig. 2, the time-modulated pulses (*b*) of Fig. 12 being applied at terminal $T_1$ and unmodulated pulses of rectangular shape as at (*c*) in Fig. 12 being applied at terminal $T_2$. At the anode of the valve $V_1$ there are then obtained pulses as at (*d*) in Fig. 12. These pulses are now applied to the circuit shown in Fig. 13 comprising two valves $V_6$ and $V_7$ having their anode circuits connected in parallel as cathode-followers with a common cathode resistor $R_6$. The pulses at (*d*) in Fig. 12 are applied at terminal $T_{15}$ and the pulses at (*a*) in Fig. 12 are applied to the terminal $T_{16}$ in Fig. 13. When an (*a*) pulse makes the grid of $V_7$ suddenly positive the common cathode terminal $T_{17}$ is driven fully positive and remains in this condition after the (*a*) pulse has ceased until the (*d*) pulse also ceases. Thus pulses as at (*e*) are obtained at the terminal $T_{17}$.

The correction of the fault at *n* in Fig. 12(*b*) may be carried out after the correction of the fault at *m* is desired.

Another arrangement for converting time-modulated channel pulses into width-modulated pulses having relatively sharp leading and trailing edges as indicated in Fig. 12(*e*) is shown in Fig. 14. The broadened and thus width-modulated channel pulses of a group such as at (*b*) in Fig. 12 are applied at a terminal $T_{18}$ and thus to a terminal $T_{19}$ connected to the control electrode of the cathode ray tube CRT and to the anode of a valve $V_8$ which is arranged by biasing to be normally insulating. The tube CRT has an apertured plate AP having a number of apertures E equal to the number of channels in the group. A view of a part of the plate AP in a direction at right angles to that in Fig. 14 is shown in Fig. 15. Behind each aperture is a collecting electrode A each of which is connected to a separate channel demodulator, for instance a low pass filter, as previously described. The plate AP is connected to the grid of a valve $V_9$ whose anode is connected to the grid of the valve $V_8$. The valve $V_9$ is arranged to be normally conducting.

The phasing of the pulses applied at $T_{18}$ in relation to the deflecting currents applied to deflecting means DF by which the cathode ray beam is caused to sweep over the apertures E is such that at the moment when a leading edge *m* in the pulses applied at $T_{18}$ occurs, the beam is within an aperture, for example at a point *a*, Fig. 15, the beam being assumed to be moving clockwise in this figure. The effect of the leading edge *m* is to release the cathode ray beam current which has been previously suppressed by biasing of the tube electrodes, and electron current, therefore, passes to one of the collecting electrodes A. Under those conditions no electrons are collected by the plate AP. Shortly before the trailing edge *n* of the pulse applied at $T_{18}$ occurs, it is arranged that the beam reaches the trailing edge $n_1$ of the aperture, whereupon the current to the electrode A is reduced and some of the beam current begins to flow to the plate AP making the grid valve $V_9$, which is connected to the plate AP by a terminal $T_{20}$, more negative and reducing the anode current in this valve preferably nearly to zero. The positive pulse so produced at the anode of the valve $V_9$ is passed to the grid of the valve $V_8$ making this valve conducting and suddenly lowering the potential of the terminal $T_{19}$ and cutting off the cathode ray.

Thus the effect of the feed-back through valves $V_8$ and $V_9$ is to steepen the trailing edge *n* of the pulses reaching the electrodes A. If it is desired also to steepen the leading edges *m*, time-modulated channel pulses of the original short duration may be applied, as indicated, to the cathode of the tube CRT at terminal $T_{21}$.

Modifications of the circuit of Fig. 14 whereby broadening of the channel pulses as well as their shaping can be accomplished are shown in Figs. 16 and 17 which replace the part of Fig. 14 shown within broken lines and including the valves $V_8$ and $V_9$.

Referring to Fig. 16, un-broadened, time-modulated channel pulses are applied at terminal $T_{18}$ to a diode $D_4$ and since they are in a positive sense they pass through the diode, charge a condenser $C_3$ and render the terminal $T_{19}$ more positive, thus releasing the cathode ray beam. The condenser $C_3$ has in parallel therewith a diode $D_5$ the cathode resistance $R_7$ of which is connected in parallel with the cathode resistance $R_8$ of a valve $V_{10}$ which is biased to be normally conducting. The cathode of the diode $D_5$ is arranged then to be sufficiently positive to render the diode insulating. The condenser $C_3$ thus holds its charge and the normal beam current continues to flow to an electrode A after the channel pulse applied at $T_{18}$ has ceased. When the beam reaches the trailing edge $n_1$ of the aperture E over which it has been passing, electrons are collected by the plate AP and render the terminal $T_{20}$ more negative, thus cutting off the current in the valve $V_{10}$ and making the cathodes of $V_{10}$ and $D_5$ more negative. The diode $D_5$ then conducts and discharges the condenser $C_3$, thus producing the required sharp trailing edge of the pulse at A.

The circuit of Fig. 16 may be replaced by a normal multivibrator circuit so arranged that a time-modulated pulses serves to trigger it and switch on the cathode ray beam thus determining the leading edge of the resulting width-modulated pulse. Feed-back from the plate AP is arranged to trigger the multi-vibrator in the opposite sense cutting off the beam.

The circuit of Fig. 17 differs from that of Fig. 16 in that the condenser $C_3$ in Fig. 17 is discharged by means of a gas-filled triode $V_{11}$ which is arranged to be normally insulating. Electrons falling on the plate AP and rendering $T_{20}$ more negative cut off current in the valve $V_{10}$ and the positive voltage pulse thus applied from the anode of $V_{10}$ to the grid of $V_{11}$ render the latter valve conducting whereby the condenser $C_3$ is discharged.

Where it is possible to convert the time-modulated pulses to width-modulated pulses without risk of cross-talk or where the pulses have already been divided into groups (for instance containing odd and even channels) so that there is sufficient time interval between adjacent channels, division into groups or sub-groups and simultaneous conversion into width-modulated pulses may be effected by the circuit of Fig. 14 or one of the modifications thereof described. The beam is then rotated at the recurrence frequency of the groups to appear at the anodes A and these anodes are connected to suitable distributors for separating the individual channels.

One of the apertures E in the plate AP of Figs. 14 and 15 may co-operate with a pair of collector plates $A_1$ and $A_2$ instead of with a single plate A. The pair of plates may be arranged to provide automatic control of synchronisation as shown in Fig. 18. The two plates $A_1$ and $A_2$ are shown connected respectively to the grids of two valves $V_{12}$ and $V_{13}$ arranged in push-pull. The anode circuits of the valves $V_{12}$ and $V_{13}$ are coupled in push-pull to the operating coil of a relay RE the armature AR of which is moved into contact with either of two fixed contacts FC according to which of the valves $V_{12}$ and $V_{13}$ is carrying the larger current. The relay RE serves to apply a battery BA to a motor MO to produce rotation thereof in a sense dependent upon which of the contacts FC is closed. The motor MO is coupled by a speed-reducing gear GE to an oscillation generator OS which generates two oscillations in phase quadrature for supplying the deflecting coils DF of the cathode ray tube CRT. The oscillator OS has its frequency controlled by received synchronising signals applied thereto by a synchronising pulse separator SE to which received signals comprising channel pulses and synchronising pulses are applied at terminals $T_{23}$.

It is arranged that when synchronism is correct a synchronising pulse, shown at SP in the waveform applied to terminal $T_{21}$ in Fig. 14 and $T_{23}$ in Fig. 18, occurs when the beam is directed upon the space between the plates $A_1$ and $A_2$ and hence neither of these plates collects electrons or each collect the same number. If, however, the beam begins to lag or lead with respect to its correct phase, one of the plates $A_1$ or $A_2$ receives more electrons than the other. If $A_1$ receives more electrons than $A_2$, for example, the current in valve $V_{12}$ falls compared with that in valve $V_{13}$, current flows in the coil of relay RE in the direction of the arrow, the lower contact FC (say) is closed and the motor MO rotates in a corresponding sense. This rotation of the motor is arranged to vary the phases of the oscillations fed from OS to coils DF in such sense as to correct the phase error which gave rise to the difference in electron collection at the plates $A_1$ and $A_2$.

I claim:

1. In a pulse multiplex receiving system in which $rs$ channels are provided by $rs$ interlaced trains of pulses, $r$ and $s$ being integers in which $r$ is greater than one, a method of demodulating the trains of pulses which comprises the steps of separating the $rs$ trains into $r$ groups each of $s$ interlaced channels, broadening the pulses of each of said groups to give said pulses thereof a time duration greater than the time duration of any one of said channels and to produce broadened pulses having one of the two edges thereof defined by the instants of occurrence of corresponding ones of said channel pulses and having the other edges thereof occurring at regularly recurring instants, separating said broadened pulses of each of said $s$ channels in each said group from one another and extracting modulation frequency components from the broadened pulses of each of the said plurality of channels.

2. Pulse multiplex receiving apparatus for demodulating time-modulated channel pulses consisting of $r$ groups each of $s$ trains of channel pulses, $r$ and $s$ being integers in which $r$ is greater than one, the pulses of said $rs$ trains being interlaced with one another, said apparatus comprising means for separating said $rs$ trains into $r$ groups each of $s$ channels, means for generating from each of the channel pulses in each of said groups a corresponding derived pulse of greater duration than said channel duration, means for defining one edge of said derived pulse by the instant of occurrence of the corresponding channel pulse, means for generating the other edge of said derived pulse at regularly recurring instants, means for separating said derived pulses of each of said $s$ channels of each said group from one another and means associated with each of said $rs$ trains for extracting modulation frequency components from the pulses of that train.

3. Apparatus according to claim 2, wherein said means for separating said derived pulses comprise a cathode ray tube, a plurality of anodes within said tube and means for scanning the cathode ray beam of said tube over said anodes at a frequency equal to $r$ times the recurrence frequency of the pulses of each of said channels, said modulation extracting means being associated with each of said anodes.

4. Apparatus according to claim 3, comprising an apertured plate disposed with an aperture thereof in the path of said beam to each of said anodes.

MAURICE MOISE LEVY.

REFERENCES CITED

The following references are of record in the file of this patent:

UNITED STATES PATENTS

| Number | Name | Date |
|---|---|---|
| 2,265,216 | Wolf | Dec. 9, 1941 |
| 2,277,192 | Wilson | Mar. 24, 1942 |
| 2,303,924 | Faudell | Dec. 1, 1942 |
| 2,423,466 | Peterson | July 8, 1947 |
| 2,426,205 | Grieg et al. | Aug. 26, 1947 |